Figure 1:
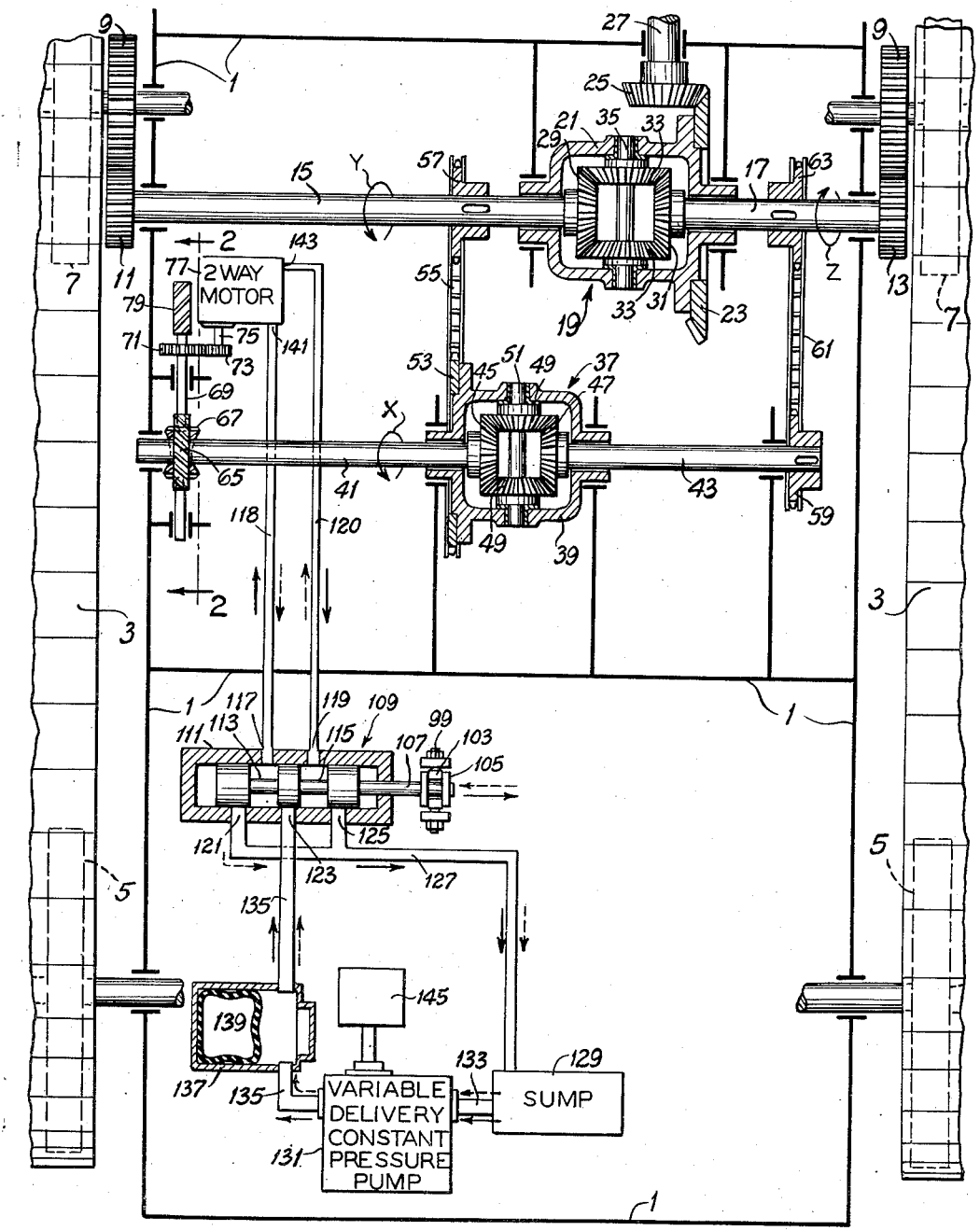

Sept. 18, 1956 C. N. NEKLUTIN 2,763,164
STEERING-BY-DRIVING CONTROL AND POWER-TRANSMITTING
MECHANISM FOR VEHICLES
Filed April 7, 1955 2 Sheets-Sheet 2
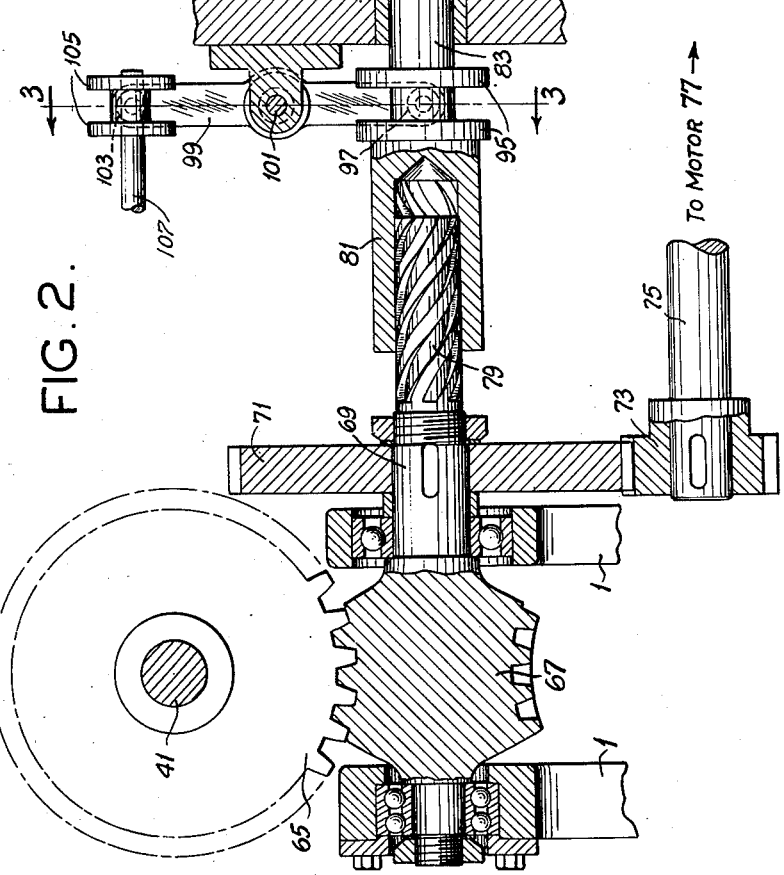
Constantine N. Neklutin
Inventor.
Koenig and Pope,
Attorneys.

though it is to be understood that this may be in the nature of a limitation as to the scope of the claims.

United States Patent Office 2,763,164
Patented Sept. 18, 1956

2,763,164

STEERING-BY-DRIVING CONTROL AND POWER-TRANSMITTING MECHANISM FOR VEHICLES

Constantine N. Neklutin, Normandy, Mo., assignor to Universal Match Corporation, Ferguson, Mo., a corporation of Delaware Application April 7, 1955, Serial No. 499,999

7 Claims. (Cl. 74—687)

This invention relates to power-transmitting and steering mechanism for tractors, tanks, automobiles and like vehicles, and particularly those which travel upon two sprocket-powered endless chain-belt or like tracks, one on each side of the machine, and sometimes referred to as endless track vehicles. The invention is an improvement upon arrangements such as shown, for example, in United States Patent 1,247,725.

Among the several objects of the invention may be noted the provision of a dependable steering mechanism for vehicles of the class described, which affords steadier, smoother and more precise control, requiring only slight manual force; the provision of a steering mechanism of the class described wherein no reverse rotation of the steering wheel is required to take the vehicle out of a turn into a straight path, and wherein the total angle through which the steering wheel turns is in direct proportion to the angle through which the vehicle turns; and the provision of a steering mechanism of the class described wherein the turning radius of the vehicle is inversely proportional to the angular velocity of the steering wheel. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a diagrammatic view showing certain driving, steering and hydraulic control parts;

Fig. 2 is a vertical section taken on line 2—2 of Fig. 1, showing certain steering control parts; and, Fig. 3 is a vertical section taken on line 3—3 of Fig. 2.

Corresponding reference characters indicate corresponding parts throughout the several views of the drawings.

Referring now more particularly to Fig. 1, the heavy single dark lines represent the frame 1 and various rotary bearing supports of the vehicle. Numeral 3 indicates endless belts or tracks on sprocket wheels 5 and 7 which support the frame 1 and which roll on the tracks 3. Each wheel 7 is driven, for example, by a gear 9, the gears 9 being driven by pinions 11 and 13, carried on shafts 15 and 17, respectively. The shafts 15 and 17 extend from a driving differential generally indexed 19.

The differential 19 consists of the usual rotary cage 21 carrying a ring gear 23 which is driven from a pinion 25 on a drive shaft 27. The usual prime mover of the vehicle, such as an internal combustion engine (not shown) drives shaft 27 through a conventional change-speed gear box (not shown). The shafts 15 and 17 are rotary in and extend from the cage 21. At their inner ends they carry bevel gears 29 and 31, respectively, which are cross-connected by bevel pinions 33. Pinions 33 are independently rotary on a pintle 35. By the above described means, power and motion may be transmitted differentially from the prime mover through the differential 19 to the driving pinions 11 and 13. For straight-line forward movement, tracks 3 must move at the same velocity and consequently shafts 15 and 17 are required to turn at the same speed under such conditions.

At numeral 37 is shown an auxiliary steering differential consisting of a rotary cage 39 from which extend control shafts 41 and 43, capable of rotation relative to the cage. These shafts within the cage 39 carry bevel gears 45 and 47, respectively, which are cross-connected by meshed bevel pinions 49, independently rotary on a pintle 51. Attached to cage 39 is a sprocket 53 connected by a chain 55 which passes over a sprocket 57 keyed on shaft 15. The pitch diameter of sprocket 53 is twice that of sprocket 57. On shaft 43 is keyed a sprocket 59 connected by a chain 61 to a sprocket 63 keyed to shaft 17. The sprockets 59 and 63 are of equal size.

On shaft 41 (to be called the lock shaft) is a worm wheel wheel 65 (see also Fig. 2) meshed with a worm 67 located on a shaft 69 to which is keyed a spur gear 71 meshed with a pinion 73. Pinion 73 is keyed to a shaft 75 of a conventional reversible hydraulic motor 77. Extending from shaft 69 is a screw 79 which is preferably steep-pitched. This screw is threaded into a control nut 81, the latter being carried on a shaft 83 which is both rotary and axially movable within a frame bearing 85. Shaft 83 carries a relatively wide pinion 87 meshed with a gear 89, the latter being keyed on a rotary steering shaft 91 carrying a steering wheel 93. Thus an angular velocity step-up on the order of 4:1 is provided between shafts 91 and 83.

On shaft 83 is a spool 95, accommodating rollers 97 on one end of a shifter fork 99, the latter being pivoted at 101 on a part attached to the frame 1.

Rollers 103 at the other end of the shifter fork 99 engage a spool 105 located on the stem 107 of a four-way valve 109. The stem 107 extends into the body 111 of the valve (Fig. 1) wherein it is provided with a spool having grooves 113 and 115 controlling ports 117, 119, 121, 123 and 125. Ports 121 and 125 are connected by means of a pipe 127 with a sump 129. At 131 is shown a conventional variable-delivery constant-pressure pump which has a suction line 133 leading to the sump 129 and a pressure outlet line 135 leading to the port 123. In the pressure line 135 is an accumulator 137 containing a flexible gas-filled bag 139. Valve ports 117 and 119 are connected by pipes 118 and 120 to ports 141 and 143, respectively, of the reversible hydraulic motor 77. The hydraulic system thus far described is filled with a suitable liquid such as oil. The pump 131 is driven from a suitable power supply 145, which may be a conventional motor excited from the usual generator driven by the prime mover, or it may be a conventional mechanical driving connection with the prime mover. This power supply operates the pump 131 continuously while the vehicle is in operation. The accumulator 137 provides pressure for emergency conditions when the prime mover is disabled and it is desired to steer the vehicle while coasting or towing it.

Operation is as follows:

Assume first that the vehicle is to proceed straight forward. Wheel 93 is stationary. Since the driving connection from worm 67 to worm wheel 65 is reversible but self-locking, i. e., incapable of return driving in either direction from the wheel 65 to the worm 67, the lock shaft 41 is locked. Rotation of the prime mover rotates pinion 25, ring gear 23 and cage 21, thus imparting equal motions to the shafts 15 and 17 through gears 29, 31 and 33. This imparts equal motions to the pinions 11 and 13 and hence through the gears 9 and sprockets 7 to the endless belts 3. Sprockets 57 and 63 consequently move at the same speed. The cage 39 will move at half the speed of the sprocket 59, rolling the bevel pinions 49 on the locked bevel gear 45. As a result, the driven pitch line velocities of the gears 49 and 47 will be equal, so that the action of the steering differential 37 is of an idling nature, cage 39 turning at half the speed of gear 47, both with reference to the stationary shaft 41.

Steering is accomplished by rotating the shaft 69, thus driving the shaft 41 through the worm and wheel drive 67, 65. This rotation must be continuous during such time as it is desired to maintain the vehicle on a curved path. In order to accomplish such continuous rotation, the steering wheel 93 is continuously rotated during such time. Rotation of the steering wheel 93 (say counterclockwise, viewed from the right in Fig. 2) turns nut 81 through the driving train 91, 89, 87, 83, 95. At the start of the turning action, the screw 79 is stationary. Therefore, the nut 81 advances axially on the screw 79 (to the left in Fig. 2). This advances spool 95 and rotates the shifter fork 99 clockwise, thus moving the spool 105 and valve stem 107. This in turn shifts to the right the internal grooves 113, 115 of the valve (Fig. 1). Then the flow through the pipes 118, 120 will be as indicated by the solid arrows in Fig. 1. This drives the hydraulic motor 77 in one direction, thus through the gears 73, 71 driving the shaft 69. The direction of turning motor 77 is such that shaft 41 (driven through gears 67, 65) rotates as indicated by dart X in Fig. 1. Therefore, reactive torque will be applied to shaft 15, as shown by the dart Y. At the same time, driving torque will be applied to shaft 17, as shown by dart Z. The reactive torque at Y is obtained through the chain drive 55, and the driving torque at Z is through the chain drive 61. As a consequence, the right-hand track 3 will be driven faster than the left-hand track 3, and the vehicle will turn to the left.

At the start of turning the steering wheel 93, the screw 79 is stationary and the advance of nut 81 increasingly opens the valve 109, which accordingly increases the speed of the hydraulic motor 77. This in turn accelerates the screw 79 through gears 73, 71, whereupon the initial relative motion between nut 81 and screw 79 decreases. This slows down the valve-opening movement of shaft 83, until a steady state is reached for a given angular velocity of the steering wheel 93, at which there is no relative movement between 79 and 81. The valve 109 then maintains a given port opening. It will then be evident that turning of the vehicle can be maintained only by maintaining an angular velocity of steering wheel 93. Moreover, the higher the angular velocity of the steering wheel 93, the higher will be the speed of the nut 81, which will require a higher speed of the screw 79 in order to obtain steady state conditions. As a consequence, under higher speeds of rotation of the steering wheel 93, the valve 109 reaches a wider open steady state position. Consequently, the hydraulic motor 77 receives more operating fluid and turns at a higher speed. This results in turning the shaft 41 at a higher speed and an increase in the difference between the speeds of shafts 15 and 17. This difference results in a shorter radius of turn. It will also be clear from the above that, in order to maintain a substantially fixed radius of curvature for a given turn, the steering wheel should be turned at a substantially constant angular velocity.

In view of the above, it will be seen that to maintain the vehicle on a curved path, continuous rotation of the steering wheel 93 is required, and that the radius of curvature of the path will be in an inverse proportion to the angular velocity of the steering wheel 93. Thus, in order to increase the radius of curvature, the angular velocity of the wheel 93 is reduced. As this occurs, the speed of the nut 81 is reduced and screw 79 tends to overrun it, thus pushing the nut 81 back axially. This tends to reclose the valve 109 until another steady state is reached at equal speeds of rotation of screw 79 and nut 81. This throttles the flow to the motor 77 and decreases the speed of shaft 41, thus decreasing the difference in speeds between shafts 15 and 17. The resulting decrease in difference in speeds of the tracks 3 increases the radius of curvature of the path along which the vehicle moves. Finally, if the rotation of steering wheel 93 is stopped, then the overrun of screw 79 forces the nut 81 back until the valve 109 is reclosed. This stops shaft 41 and the difference in speed of shafts 15 and 17 becomes zero and the vehicle proceeds on a straight, forward path. Obviously, then, to take the vehicle out of a turn and into a straight path does not require reversing turning of wheel 93, but only that it be stopped at any position that it may happen to have. The next steering event then starts from that position.

The total angle through which the vehicle turns is in direct proportion to the total angle (revolutions) through which the wheel 93 is turned, regardless of the speed of turning. Therefore a predetermined number of revolutions of wheel 93 at any speed results in a 180° vehicle turn (or reversal of direction); half that number of revolutions of wheel 93 causes a 90° vehicle turn, etc. On the other hand, the radius of the turning of the vehicle is inversely proportional to the speed of turning wheel 93. These operations result in a very desirable form of steering control, particularly for heavy vehicles such as tanks.

Throughout the above description, a given direction of movement of the steering wheel 93 has been assumed. In order to reverse the turning of the vehicle, the wheel 93 is turned in the reverse direction. This reverses the axial screw action of nut 81 on initially stationary screw 79, thus reversing the direction of movement of the grooves 113, 115 in valve 109. This reverses the flow of fluid through the hydraulic motor 77, as indicated by the dotted lines in Fig. 1. As a result, the rotation of shaft 75 is reversed, as is also the entire drive from it to the shaft 41. Under these conditions, the darts X, Y and Z may each be taken to be reversed in direction, so that the angular velocity of shaft 17 is increased over that of shaft 15. Under these conditions, the left-hand track 3 moves faster than the right-hand track 3, and the vehicle will turn clockwise. The action in connection with screw 79 and nut 81 in attaining steady state conditions in the setting of valve 109 is the same as already described, except that they both turn in a reverse direction. Initial valve-opening movement of the nut 81 is by its axial retraction to the right in Fig. 2, and the corrective action upon relative rotation of the screw 79 draws the nut 81 to the left.

It will be understood that the source of power for the pump 131 and motor 77 is the driving member 145, and that this is designed with sufficient power to perform the work needed in order to turn the vehicle or it may represent a drive from the engine supplying the power to the main driving shaft 27. It will also be observed that the operator who turns wheel 93 does not manually supply the power required to turn the vehicle, and there is no reaction on the steering wheel from any forces involved in delivering power for turning. The only manual forces required to be overcome by the steering wheel 93 are the small parasitic frictional forces involved in rotating members 91, 89, 87, 83, 95 and 81. The result is that heavy vehicles may be smoothly and accurately turned with very little effort.

It will be understood that, while member 81 has been shown and described as a nut and 79 as a screw, 81 may be the screw and 79 the nut; also that equivalent screw devices may be used as, for example, a bayonet slotted tube and pin or equivalent.

In order to facilitate continuous manual rotation of wheel 93, it may be provided with a hand crankpin, as indicated at 94.

While the invention has been particularly described in connection with endless track vehicles, it is applicable also to other types employing differential drive means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a power-transmitting mechanism having a driving differential connected with driven shafts and an auxiliary differential including a cage member and control shaft members one member of which is a lock member adapted to be locked, the other two members being operatively connected with the driven shafts to idle when said lock member is locked but to apply a reversible reactive torque between the driven shafts when said lock member is unlocked and driven in one direction or the other; the improvement comprising a self locking drive for the lock member consisting of a reversible driving member and a driven member and including a self locking connection between said driving and driven members adapted to prevent a return drive from the latter to the former, reversible power means for said driving member, a rotary control member, and means adapted to activate said power means in one direction or another responsive only to continuous rotation in one direction or another of said control member.

2. Power-transmitting apparatus made according to claim 1, including means controlling the speed of said power means responsive proportionally only to the speed of rotation of said control member.

3. In a power-transmitting mechanism having a driving differential connected with driven shafts and an auxiliary differential including a cage member and control shaft members one member of which is a lock member adapted to be locked, the other two members being operatively connected with the driven shafts to idle when said lock member is locked but to apply a reversible reactive torque between the driven shafts when said lock member is unlocked and driven in one direction or the other; the improvement comprising a self locking drive for the lock member, said drive consisting of a reversible driving member carrying a driving worm, a driven member carrying a worm wheel meshing with the worm but incapable of return driving action on the worm, reversible power means adapted to drive said driving member, a rotary control member, and means adapted to activate said power means in one direction or another responsive only to continuous rotation in one direction or another of said control member.

4. Power-transmitting apparatus made according to claim 3, including means controlling the speed of said power means responsive proportionally only to the speed of rotation of said control member.

5. In a power-transmitting and steering mechanism having a driving differential connected with driven shafts and an auxiliary steering differential including a cage member and control shaft members one member of which is a lock member adapted to be locked, the other two members being operatively connected with the driven shafts to idle when said lock member is locked but to apply reactive torque between the driven shafts when said lock member is unlocked and driven; the improvement comprising a self locking drive for the lock member, said drive consisting of a driving member carrying a driving worm, a driven member carrying a worm wheel meshed with the worm but incapable of return driving action on the worm, power means adapted to drive said driving member, means adapted to energize said power means, control apparatus for said energizing means, a steering member adapted to operate said control apparatus including a first screw member which is axially movable and rotatable from the steering member and operative upon said control apparatus upon axial movement, and a second screw member adapted to be rotated by said driving member, said second screw member being rotatable but not axially movable and having a screw connection with the first screw member, whereby differential movements between the first and second screw members as determined by rotation of the steering member and of said driving member respectively determine the axial position of the first screw member so as to operate said control apparatus to control the flow of power to said driving member.

6. A power-transmitting and steering mechanism made according to claim 5, wherein said power means for driving said driving member is reversible and wherein said control apparatus is reversible in its control action on said power means.

7. A power-transmitting and steering mechanism made according to claim 5, wherein said power means for driving said driving member is constituted by a reversible hydraulic motor, the means for energizing the motor is a hydraulic circuit, and said control apparatus is constituted by a hydraulic valve in said circuit adapted to be positioned by axial movements of said first screw member to reverse the flow in said circuit.

References Cited in the file of this patent

UNITED STATES PATENTS

| | | |
|---|---|---|
| 1,247,725 | Schneider | Nov. 27, 1917 |
| 1,359,679 | Fee | Nov. 23, 1920 |
| 2,336,912 | Zimmerman | Dec. 14, 1943 |